(12) United States Patent
Kwun et al.

(10) Patent No.: US 7,586,992 B2
(45) Date of Patent: Sep. 8, 2009

(54) APPARATUS AND METHOD FOR CHANNEL ESTIMATION AND CYCLIC PREFIX RECONSTRUCTION IN AN OFDM-STBC MOBILE COMMUNICATION SYSTEM

(75) Inventors: Jong-Hyung Kwun, Suwon-si (KR); Eung-Sun Kim, Suwon-si (KR); Jong-Hyeuk Lee, Seongnam-si (KR); Gi-Hong Im, Pohang-si (KR); Hui-Chul Won, Busan (KR)

(73) Assignees: Samsung Electronics Co., Ltd (KR); Postech Foundation (KR)

( * ) Notice: Subject to any disclaimer, the term of this patent is extended or adjusted under 35 U.S.C. 154(b) by 646 days.

(21) Appl. No.: 11/335,268

(22) Filed: Jan. 19, 2006

(65) Prior Publication Data

US 2006/0159196 A1  Jul. 20, 2006

(30) Foreign Application Priority Data

Jan. 19, 2005  (KR) ............... 10-2005-0005152

(51) Int. Cl.
*H04L 1/02* (2006.01)
(52) U.S. Cl. .............. 375/267; 375/260; 375/348; 375/350; 375/347; 370/319; 370/320; 370/321; 370/330; 370/335; 370/342; 370/346; 370/347; 342/150; 342/151; 342/152; 342/153; 342/154; 333/193; 333/194; 333/195; 333/196

(58) Field of Classification Search .......... 375/148, 375/260, 348, 350, 347; 370/319, 320, 321, 370/330, 335, 342, 346, 347; 342/150, 151, 342/152, 153, 154, 155; 333/193, 194, 195, 333/196

See application file for complete search history.

(56) References Cited

U.S. PATENT DOCUMENTS

| 2004/0022183 A1* | 2/2004 | Li et al. ............... 370/210 |
| 2004/0081263 A1* | 4/2004 | Lee et al. ............. 375/347 |
| 2004/0247020 A1* | 12/2004 | Mills et al. ........... 375/148 |
| 2006/0159187 A1* | 7/2006 | Wang et al. ........... 375/260 |

* cited by examiner

*Primary Examiner*—Helene Tayong
(74) *Attorney, Agent, or Firm*—The Farrell Law Firm, LLP

(57) ABSTRACT

An apparatus and method for channel estimation and CP reconstruction in an OFDM-STBC mobile communication system are provided. An ISI canceller cancels ISI signal components from first and second received symbol sequences. A cyclicity restorer cancels ICI signal components from the ISI-cancelled first received symbol sequence and the ISI-cancelled second received symbol sequence. A recoverer acquires the recovered sequence estimates of the ICI-cancelled first received symbol sequence and the ICI-cancelled second received symbol sequence by decoding. The ICI cancellation of the ISI-cancelled first and second received symbol sequences and the ISI cancellation of the second received symbol sequence are iterated a predetermined number of times.

16 Claims, 9 Drawing Sheets

US 7,586,992 B2

APPARATUS AND METHOD FOR CHANNEL ESTIMATION AND CYCLIC PREFIX RECONSTRUCTION IN AN OFDM-STBC MOBILE COMMUNICATION SYSTEM

PRIORITY

This application claims priority under 35 U.S.C. § 119 to an application entitled "Apparatus and Method for Channel Estimation and Cyclic Prefix Reconstruction in an OFDM-STBC Mobile Communication System" filed in the Korean Intellectual Property Office on Jan. 19, 2005 and assigned Serial No. 2005-5152, the contents of which are incorporated herein by reference.

BACKGROUND OF THE INVENTION

1. Field of the Invention

The present invention relates generally to an apparatus and method for channel estimation and Cyclic Prefix (CP) reconstruction in an Orthogonal Frequency Division Multiplexing (OFDM) mobile communication system, and in particular, to an apparatus and method for channel estimation and CP reconstruction in an Orthogonal Frequency Division Multiplexing-Space-Time Block Coding (OFDM-STBC) mobile communication system.

2. Description of the Related Art

Today's mobile communication systems are evolving toward high-speed, high-quality mobile communication systems for providing data service and multimedia service beyond the traditional voice service. For provisioning of such a high-speed, high-quality data service, OFDM is considered prominent for $4^{th}$ generation mobile communication systems due to its excellent resource use efficiency. Orthogonal Frequency Division Multiple Access (OFDMA) or Orthogonal Frequency Division Multiplexing-Frequency Division Multiple Access (OFDM-FDMA) is a major OFDM system in which a plurality of users share a given time using different subchannels.

Meanwhile, factors inherent to a radio channel environment impose constraints on use of high-order modulation schemes and high coding rates for the high-speed, high-quality data service. The factors include white noise, fading-caused change in received signal power, shadowing, Doppler effects caused by the mobility and frequent velocity change of Mobile Stations (MSs), and interference from other users and multipath signals. Accordingly, mobile communication systems adaptively use modulation and coding schemes according to the varying radio channel environments. To do so, accurate channel estimation is essential.

When a channel changes fast as in a fast mobile environment, the change is present even within one OFDM symbol in the OFDM mobile communication system. The resulting loss of orthogonality between subchannels leads to severe Inter-Carrier Interference (ICI) and Inter-Symbol Interference (ISI). The ICI and ISI significantly deteriorate channel estimation performance and thus the use of an error correction code is still not effective in improving the reliability of recovered symbols.

The OFDM system decreases the ISI and ICI generally by increasing a symbol duration in proportion to the number of subcarriers. The most general way is to add a guard interval every predetermined number of transmission symbols. A copy of last few symbols is inserted as a guard interval called a CP. The number of the inserted symbols is usually determined by that of subcarriers. The CP must be longer than a Channel Impulse Response (CIR) representing the characteristics of a radio channel. If the CIR is longer than the CP, the ICI and ISI deteriorate system performance. However, the CP insertion decreases frequency efficiency. That is, the transmission period of data symbols is reduced by as much as the CP length.

Accordingly, a need exists for reducing a CP length and reproducing a shortened CP iteratively in order to minimize the decrease of frequency efficiency. Residual Inter-Symbol Interference Cancellation (RISIC) is a major one of such techniques. The RISIC is a technique of eliminating ICI and ISI components caused by the use of a CP of insufficient length, that is, a CP shorter than a CIR. It involves tail cancellation and cyclicity restoration. The tail cancellation eliminates an ISI signal component from a current symbol using the previous symbol estimate. The cyclicity restoration cancels an ICI signal component from the current symbol by iterative symbol reconstruction and cyclic reconstruction. The RISIC is generalized as shown in Equation (1):

$$\tilde{r}_k^j = r_k^j - \sum_{l=G+k+1}^{L} h_l x_{(k-l+G)_N}^{j-1} + \sum_{l=G+k+1}^{L} h_l x_{(k-l)_N}^{j-1}, \quad 0 \le k < L-G \qquad (1)$$

Tail Cancellation          Cyclicity Restoration $\{r_k^j\}_{k=0}^{N-1}$ : $i^{th}$ received symbol sequence          $h_l$ : $l^{th}$ tap of CIR   G : CP length $\{x_k^j\}_{k=0}^{N-1}$ : $i^{th}$ time-domain transmitted symbol sequence   $(k)_N$ : $k$ modulo N   L : CIR length As described above, the RISIC eliminates the ISI and ICI signal components by tail cancellation and cyclicity restoration. This RISIC technique requires channel information, and inaccurate channel information may cause error propagation. Therefore, a method for estimating channel information accurately is needed to cancel the ISI and ICI by the RISIC.

Since many existing channel estimation schemes for the OFDM system are based on the premise that a CP is longer than a CIR, they are not feasible for the RISIC and if used, they cause severe performance degradation. Hence, a channel estimation technique for an OFDM system using the RISIC is yet to be developed.

The mobile communication systems use multiple antenna schemes to transmit a large amount of data at a low error probability. One of them is STBC which is a closed-loop scheme operating without feedback channel information.

However, considering that the RISIC was developed for application to an OFDM system using a single transmit antenna, it is not viable for an OFDM-STBC system. Accordingly, there exists a need for a method of achieving antenna diversity gain by applying the RISIC to the OFDM-STBC system.

SUMMARY OF THE INVENTION

An object of the present invention is to substantially solve at least the above problems and/or disadvantages and to provide at least the advantages below. Accordingly, the present invention provides a channel estimation method in an OFDM system using an insufficient CP.

The present invention also provides a channel estimation method for accurate channel estimation in applying the RISIC technique to an OFDM system.

The present invention also provides an apparatus and method for implementing the RISIC technique in an OFDM-STBC system.

The present invention also provides a CP reproducing apparatus and method for eliminating ISI and ICI in an OFDM-STBC system.

The present invention also provides an apparatus and method for eliminating ISI and ICI signal components from a plurality of symbols received simultaneously in an OFDM system using a multiple antenna scheme.

The present invention also provides an apparatus and method for minimizing RISIC-incurred complexity in an OFDM-STBC system.

According to one aspect of the present invention, in a method of receiving symbols transmitted in pairs in an OFDM mobile communication system using at least two transmit antennas and one receive antenna, an ISI signal component is cancelled from a first received symbol sequence using a recovered sequence estimate of previous received symbols. An ICI signal component is cancelled from the ISI-cancelled first received symbol sequence using a previous recovered sequence estimate of the first received symbol sequence. A recovered sequence estimate of the ICI-cancelled first received symbol sequence is acquired by decoding the ICI-cancelled first received symbol sequence. An ISI signal component is cancelled from a second received symbol sequence using the recovered sequence estimate of the first received symbol sequence. An ICI signal component is cancelled from the ISI-cancelled second received symbol sequence using a previous recovered sequence estimate of the second received symbol sequence. A recovered sequence estimate of the ICI-cancelled second received symbol sequence is acquired by decoding the ICI-cancelled second received symbol sequence. The ICI cancellation of the ISI-cancelled first received symbol sequence, the ISI cancellation of the second received symbol sequence, and the ICI cancellation of the ISI-cancelled second received symbol sequence are iterated a predetermined number of times.

According to another aspect of the present invention, in an apparatus for receiving symbols transmitted in pairs in an OFDM mobile communication system using at least two transmit antennas and one receive antenna, an ISI canceller for cancels an ISI signal component from a first received symbol sequence using a recovered sequence estimate of previous received symbols, and cancels an ISI signal component from a second received symbol sequence using a recovered sequence estimate of the first received symbol sequence. A cyclicity restorer cancels an ICI signal component from the ISI-cancelled first received symbol sequence using a previous recovered sequence estimate of the first received symbol sequence and cancels an ICI signal component from the ISI-cancelled second received symbol sequence using a previous recovered sequence estimate of the second received symbol sequence. A recoverer acquires the recovered sequence estimate of the ICI-cancelled first received symbol sequence by decoding the ICI-cancelled first received symbol sequence, and acquires the recovered sequence estimate of the ICI-cancelled second received symbol sequence by decoding the ICI-cancelled second received symbol sequence. The ICI cancellation of the ISI-cancelled first received symbol sequence, the ISI cancellation of the second received symbol sequence, and the ICI cancellation of the ISI-cancelled second received symbol sequence are iterated a predetermined number of times.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
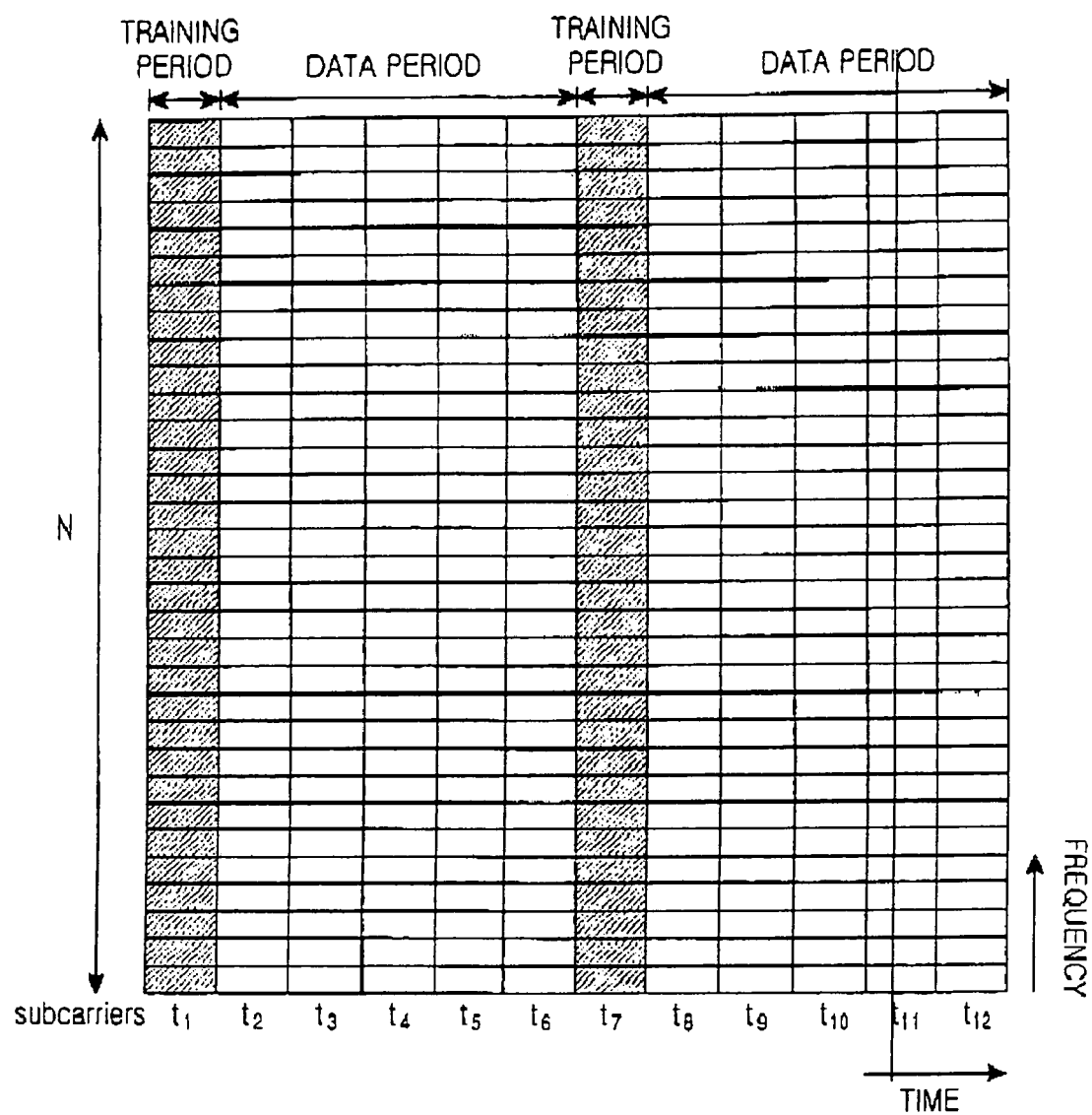
FIG. 1 illustrates a frame structure in an OFDM mobile communication system [PLEASE LABEL "PRIOR ART".-OK.]

Preferred embodiments of the present invention will be described herein below with reference to the accompanying drawings. In the following description, well-known functions or constructions are not described in detail since they would obscure the invention in unnecessary detail.

The present invention is intended to provide a channel estimation scheme for use in an OFDM system using a CP shorter than a CIR or without using a CP. It also provides a method of reproducing a CP through tail cancellation and cyclicity restoration in an OFDM-STBC system. In relation to the CP reconstruction, a method of minimizing receiver complexity is also presented. Finally, the present invention provides a method of combining the channel estimation with the CP reconstruction.

1. Channel Estimator and Channel Estimation

A description will first be made of a typical channel estimation method for application to an OFDM system using the RISIC, followed by a description of a channel estimation method for an OFDM system using a CP of insufficient length, that is, using a CP shorter than a CIR or without using a CP according to the present invention.

OFDM System Using RISIC

In the RISIC-using OFDM system, a transmitter converts a frequency-domain $i^{th}$ symbol sequence $\{X_n^i\}_{n=0}^{N-1}$ to a time-domain $i^{th}$ symbol sequence $\{x_k^i\}_{k=0}^{N-1}$ by Inverse Fast Fourier Transform (IFFT) and inserts a CP having a length of G into $\{x_k^i\}_{k=0}^{N-1}$, prior to transmission. N is the number of subchannels.

A receiver receives the $i^{th}$ symbol sequence $r_k^i$ expressed as Equation (2):

$$r_k^i = \begin{cases} \sum_{l=0}^{G+k} h_l x_{(k-l)_N}^i + \sum_{l=G+k+1}^{L} h_l x_{(k-l+G)_N}^{i-1} + n_k^i, & -G \leq k < L-G \\ \sum_{l=0}^{L} h_l x_{(k-l)_N}^i, & L-G \leq k < N \end{cases} \quad (2)$$

where L is the length of a CIR, $(k)_N$ is the remainder of dividing k by N, $h_l$ is the $l^{th}$ tap of the CIR, and $n_k^i$ is noise.

As noted from Equation (2), if G<L, an interference signal exists in the first (L-G) samples, $\{r_k^i\}_{k=0}^{N-1}$. To cancel the interference signal, the RISIC carries out tail cancellation and cyclic reconstruction. Thus, a received $i^{th}$ symbol sequence $\tilde{r}_k^i$ having ISI and ICI cancelled is acquired by the RISIC, as shown in Equation (3):

$$\tilde{r}_k^i = r_k^i - \sum_{l=G+k+1}^{L} h_l x_{(k-l+G)_N}^{i-1} + \sum_{l=G+k+1}^{L} h_l x_{(k-l)_N}^{i-1}, \quad 0 \leq k < L-G \quad (3)$$

where $$r_k^i - \sum_{l=G+k+1}^{L} h_l x_{(k-l+G)_N}^{i-1}$$

corresponds to tail cancellation for eliminating the ISI signal component and addition of $$\sum_{l=G+k+1}^{L} h_l x_{(k-l)_N}^i$$

corresponds to cyclicity restoration for eliminating the ICI signal component.

Equation (3) indicates that a recovered $(i-1)^{th}$ symbol sequence $x_{(k-i+G)_N}^{i-1}$ is used for ISI cancellation, and symbol reconstruction and cyclic reconstruction are iterated on an $i^{th}$ recovered sequence estimate $\{\hat{x}_k^i\}_{k=0}^{N-1}$. It is noted that accurate channel information is required for the RISIC technique described by Equation. (3). A parameter associated with the channel information is $h_l$ in Equation. (3).

As described before, the present invention provides a channel estimation technique for achieving accurate channel information essential to implementation of the RISIC in an OFDM system using a CP of insufficient length.

If G<L, orthogonality is lost between subchannels, causing ICI. Existing channel estimation techniques bring serious performance degradation to the OFDM system using a CP of insufficient length because they are based on the premise of a CP of sufficient length.

For the OFDM system using a CP having an insufficient length of G, Equation (2) is reduced to Equation (4):

$$r_i = \gamma_i h_i + n_i \quad (4)$$

where $r_i$ denotes a received $i^{th}$ symbol vector, $\gamma_i$ denotes a matrix composed with $(i-1)^{th}$ and $i^{th}$ transmission symbol vectors, $h_i$ denotes the CIR vector of the $i^{th}$ symbol period, and $n_i$ denotes a noise vector.

Thus, Equation (4) is expressed as shown in Equation (5):

$$\begin{bmatrix} r_{-G}^i \\ r_{-G-1}^i \\ \vdots \\ r_{L-G-1}^i \\ r_{L-G}^i \\ \vdots \\ r_{N-1}^i \end{bmatrix} = \begin{bmatrix} x_{N-G}^i & x_{N-1}^{i-1} & x_{N-2}^{i-1} & \cdots & x_{N-L}^{i-1} \\ x_{N-G+1}^i & x_{N-G}^i & x_{N-1}^{i-1} & \cdots & x_{N-L+1}^{i-1} \\ & & \ddots & & \\ x_{N+L-G-1}^i & \cdots & x_{N-G+1}^i & x_{N-G}^i & x_{N-1}^{i-1} \\ x_{N+L-G}^i & x_{N+L-G-1}^i & \cdots & x_{N-G+1}^i & x_{N-G}^i \\ & & \ddots & & \\ x_{N-1}^i & x_{N-2}^i & \cdots & x_{N-L}^i & x_{N-L-1}^i \end{bmatrix} \begin{bmatrix} h_0 \\ h_1 \\ \vdots \\ h_L \end{bmatrix} + \begin{bmatrix} n_{-G}^i \\ n_{-G-1}^i \\ \vdots \\ n_{L-G-1}^i \\ n_{L-G}^i \\ \vdots \\ n_{N-1}^i \end{bmatrix} \quad (5)$$

For $2i^{th}$ and $(2i+1)^{th}$ symbols in an OFDM-STBC system for example, the channel equation is given as Equation (6):

$$\begin{bmatrix} r_{-G}^{2i} \\ r_{-G-1}^{2i} \\ \vdots \\ r_{N-1}^{2i} \\ r_{-G}^{2i+1} \\ r_{-G-1}^{2i+1} \\ \vdots \\ r_{N-1}^{2i+1} \end{bmatrix} = \begin{bmatrix} \gamma_{2i,1} & \gamma_{2i,2} \\ \gamma_{2i,1,1} & \gamma_{2i+1,2} \end{bmatrix} \begin{bmatrix} h_0^1 \\ h_1^1 \\ \vdots \\ h_L^1 \\ h_0^2 \\ h_1^2 \\ \vdots \\ h_L^2 \end{bmatrix} + \begin{bmatrix} n_{-G}^{2i} \\ n_{-G-1}^{2i} \\ \vdots \\ n_{N-1}^{2i} \\ n_{-G}^{2i+1} \\ n_{-G-1}^{2i+1} \\ \vdots \\ n_{N-1}^{2i+1} \end{bmatrix} \quad (6)$$

Here, $\gamma_{m,p}$ is defined as shown in Equation (7):

$$\gamma_{m,p} = \begin{bmatrix} x_{N-G}^{p,m} & x_{N-1}^{p,m-1} & x_{N-2}^{p,m-1} & \cdots & x_{N-L}^{p,m-1} \\ x_{N-G+1}^{p,m} & x_{N-G}^{p,m} & x_{N-1}^{p,m-1} & \cdots & x_{N-L+1}^{p,m-1} \\ & & \ddots & & \\ x_{N+L-G-1}^{p,m} & \cdots & x_{N-G+1}^{p,m} & x_{N-G}^{p,m} & x_{N-1}^{p,m-1} \\ x_{N+L-G}^{p,m} & x_{N+L-G-1}^{p,m} & \cdots & x_{N-G+1}^{p,m} & x_{N-G}^{p,m} \\ & & \ddots & & \\ x_{N-1}^{p,m} & x_{N-2}^{p,m} & \cdots & x_{N-L}^{p,m} & x_{N-L-1}^{p,m} \end{bmatrix} \quad (7)$$

where p denotes the indexes of transmit antennas, and 1, 2 and m denote the indexes of transmission symbol sequences, 2i and (2i+1).

An OFDM frame has a training period in which a training sequence is transmitted every predetermined time of period, as illustrated in FIG. 1. Referring to FIG. 1, a training period and a data period are defined on a time axis in the OFDM frame. A training sequence is transmitted during the training period, for channel estimation, and data symbols during the data period. The training sequence is known to both the transmitter and the receiver according to a preset agreement. The transmission cycle of the training sequence can be set randomly according to a radio channel environment. It is lengthened in a good radio channel condition and shortened in a bad radio channel condition. Hence, channel estimation is performed on the training period and the data period in different manners in of the present invention.

As stated above, a known signal matrix is transmitted during the training period. The channel estimation of the training period is performed according to Equation (8):

$$\hat{h}_i = \underset{h_i}{\arg\min} \|r_i - \gamma_i h_i\|^2 \quad (8)$$

which determines $h_i$ offering the minimum of the average power of noise $(r_i - \gamma_i h_i)$ to be a channel estimate $\hat{h}_i$.

Compared to the training sequence, a signal matrix $\gamma_i$ transmitted during the data period is not known. Thus, the channel estimation of the data period is carried out by minimizing the average value of a cost function according to the following Equation (9):

$$\hat{h}_i = \underset{h_i}{\arg\min} E[\|r_i - \gamma_i h_i\|^2] \quad (9)$$

$$= (E[\gamma_i^H \gamma_i | r_i, h_i])^{-1} E[\gamma_i | r_i, h_i]^H r_i$$

where $E[x]$ denotes an expected value of a random variable x. Meanwhile, $E[\gamma_i^H \gamma_i | r_i, h_i]$ and $E[\gamma_i | r_i, h_i]$ shown in Equation (7) can be computed by use of the extrinsic probability of a Soft-Input Soft-Output (SISO) decoder and an $(i-1)^{th}$ recovered sequence estimate $\{\hat{x}_k^{i-1}\}_{k=0}^{N-1}$.

Figure 2:
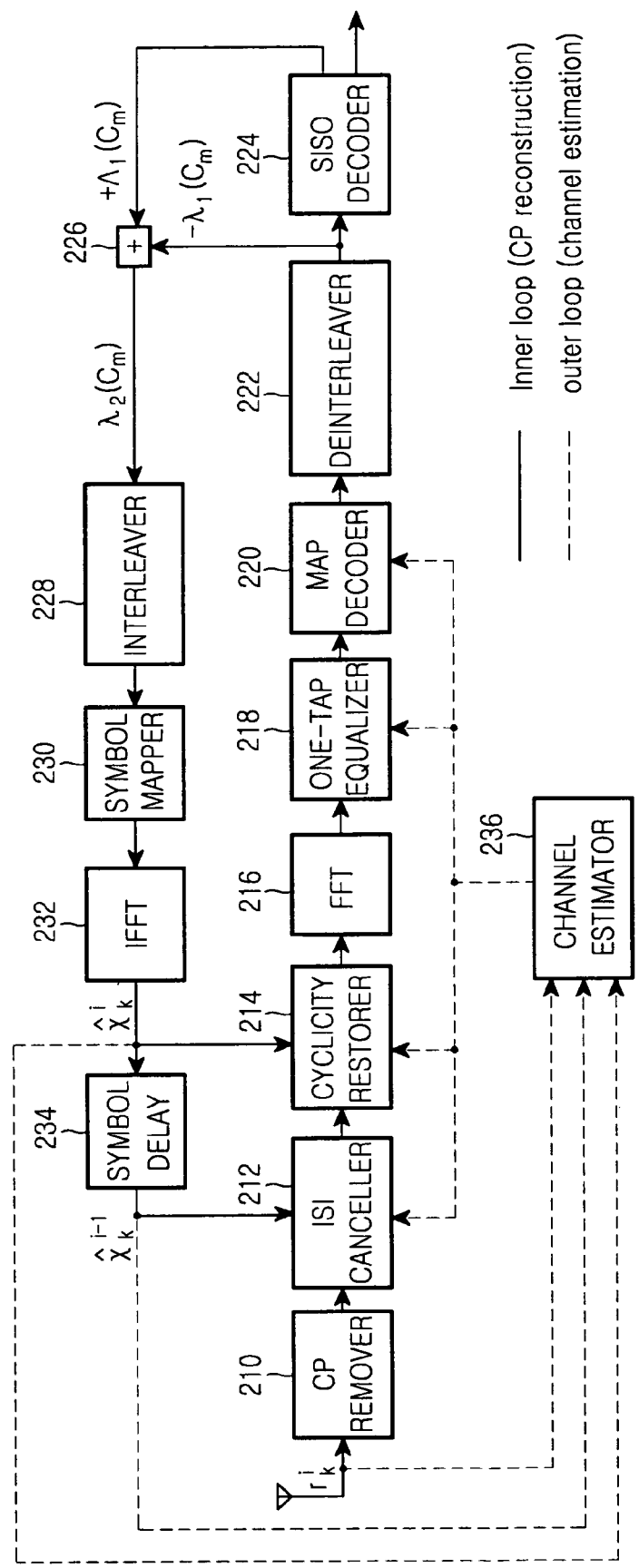
FIG. 2 is a block diagram of a channel estimation apparatus for a receiver in an OFDM system according to an embodiment of the present invention.

FIG. 2 is a block diagram of a channel estimation apparatus for a receiver in an OFDM system according to the present invention.

Referring to FIG. 2, an $i^{th}$ symbol sequence $r_k^i$ received through an antenna is provided to a CP remover 210 and a channel estimator 236. The CP remover 210 removes a CP from $r_k^i$. An ISI canceller 212 cancels an ISI component from the CP-removed signal. A cyclicity restorer 214 cancels an ICI component from the $i^{th}$ ISI-cancelled symbol sequence. The operations of the ISI canceller 212 and the cyclicity restorer 214 will be described in more detail below.

A Fast Fourier Transform (FFT) processor 216 converts the $i^{th}$ symbol sequence free of ISI and ICI components from the time domain to the frequency domain. A one-tap equalizer 218 performs one-tap equalization on the frequency-domain $i^{th}$ symbol sequence. A map decoder 220 calculates a Log Likelihood Ratio (LLR) $\lambda_1(c_m)$ for each coded bit of the equalized symbol sequence. A deinterleaver 222 deinterleaves the LLR values $\lambda_1(c_m)$ and a SISO decoder 224 calculates aposteriori LLRs $\Lambda_1(c_m)$ using $\lambda_1(c_m)$.

A subtractor 226 subtracts $\lambda_1(c_m)$ from $\Lambda_1(c_m)$, thereby creating the extrinsic probabilities of the coded bits, $\lambda_2(c_m)$. An interleaver 228 interleaves $\lambda_2(c_m)$ and a symbol mapper 230 maps the interleaved $\lambda_2(c_m)$ to symbols. An Inverse Fast Fourier Transform (IFFT) processor 232 converts the frequency-domain symbols to time-domain symbols which are an $i^{th}$ recovered symbol sequence estimate $\hat{x}_k^i$. $\hat{x}_k^i$ is provided to the cyclicity restorer 214, a symbol delay 234, and the channel estimator 236. The symbol delay 234 delays $\hat{x}_k^i$. Thus, the output of the symbol delay 234 becomes the previous recovered sequence estimate, that is, an $(i-1)^{th}$ recovered sequence estimate $\hat{x}_k^{i-1}$. $\hat{x}_k^{i-1}$ is provided to the ISI canceller 212 and the channel estimator 236.

The channel estimator 236 estimates the current channel condition using $r_k^i$, $\hat{x}_k^i$ and $\hat{x}_k^{i-1}$. Specifically, the transmitted $i^{th}$ symbol sequence $\gamma_i$ is estimated using $\hat{x}_k^i$ and $\hat{x}_k^{i-1}$, and the current channel condition is estimated using $\gamma_i$, $r_k^i$ and the already estimated CIR $\hat{h}_i$. If $r_k^i$ is a training symbol, $\hat{h}_i$ is computed by Equation (8) and if $r_k^i$ is a data symbol, it is computed by Equation (9). These channel estimations occur according to a predetermined iteration number, which will be detailed below.

The ISI canceller 212 cancels an ISI signal component calculated using $\hat{x}_k^{i-1}$ and $\hat{h}_i$ from $r_k^i$. The cyclicity restorer 214 calculates an ICI signal component using $\hat{x}_k^i$ and $\hat{h}_i$ and performs cyclicity restoration on the ISI-cancelled signal $r_k^i - \hat{h}_i \hat{x}_{(k)}^{i-1}$.

The tail cancellation (ISI cancellation) and the cyclicity restoration are iteratively carried out until an optimum received signal is achieved. Consequently, an optimum channel estimation is enabled for the OFDM system using a CP having an insufficient length.

Figure 3:
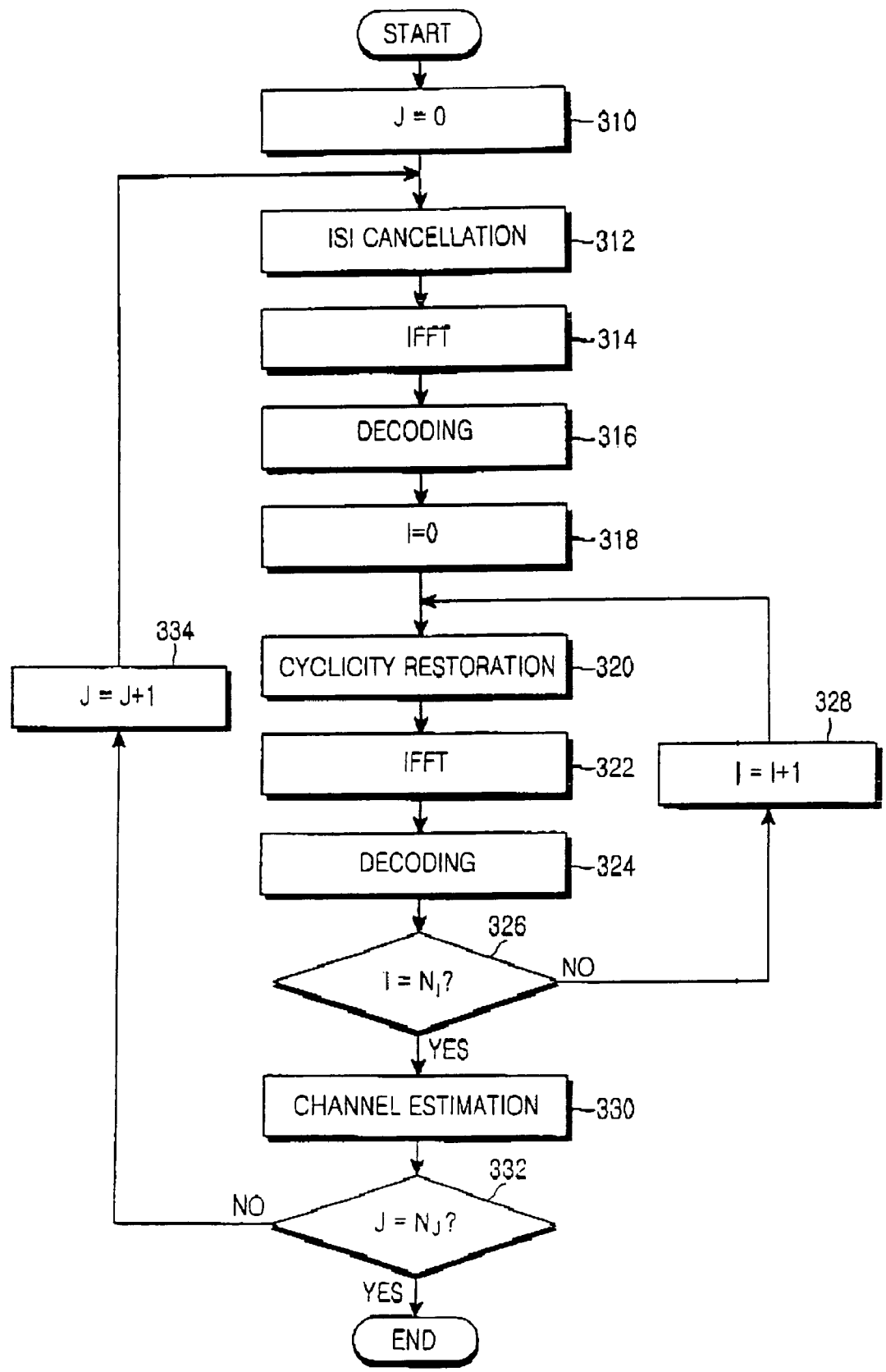
FIG. 3 is a flowchart illustrating a control operation for implementing the RISIC technique according to an embodiment of the present invention.

FIG. 3 is a flowchart illustrating a control operation for an RISIC technique for performing the channel estimation according to the present invention. Variables used in this procedure $N_I$ and $N_J$ are iteration numbers set for CP reconstruction and channel estimation, respectively.

Referring to FIG. 3, a parameter J indicating the iteration count of channel estimation is set to an initial value 0 in step 310. In step 312, a previous frequency-domain estimated symbol, that is, an $(i-1)^{th}$ recovered sequence estimate $\{\hat{X}_n^{i-1}\}_{n=0}^{N-1}$ is converted to a time-domain signal $\{\hat{x}_K^{i-1}\}_{K=0}^{N-1}$. Subsquently, an ISI signal component is cancelled from a received $i^{th}$ symbol sequence $r_k^i$ using $\{\hat{x}_k^{i-1}\}_{k=0}^{N-1}$. The ISI cancellation is defined as Equation (10):

$$\tilde{r}_k^{i,(I=0)} = \begin{cases} r_k^i - \sum_{l=G+k+1}^{L} \hat{h}_l^{(J)} \hat{x}_{(k-l+G)_N}^{i-1}, & 0 \le k < L-G \\ r_k^i, & L-G \le k < N \end{cases} \quad (10)$$

where $\hat{h}_l^{(J)}$ is the $l^{th}$ element of $\hat{h}_i^{(J)}$, and the final channel estimate of the previous symbol period $(i-1)$, $\hat{h}_{i-1}^{(J=N_J)}$ is used as the initial channel estimate of the $i^{th}$ symbol, $\hat{h}_i^{(J=0)}$.

At the first channel estimation (I=0), cyclicity restoration is not available because the current received symbol has not yet estimated. Therefore, an estimate of a current frequency-domain symbol, that is, an $i^{th}$ recovered symbol sequence estimate $\{\hat{X}_n^{i,(I=0)}\}_{n=0}^{N-1}$ is acquired from $\{\tilde{r}_k^{i,(I=0)}\}_{k=0}^{N-1}$ and converted to a time-domain recovered sequence estimate $\{\hat{x}_k^{i,(I=0)}\}_{k=0}^{N-1}$ in steps 314 and 316. In step 318, a parameter I indicating the iteration count of cyclicity restoration during the CP reconstruction is set to an initial value 0.

In steps 320 to 328, cyclicity restoration is iterated $N_I$ times in order to cancel an ICI signal component. Specifically, in step 320, cyclicity restoration is performed on the $i^{th}$ received symbol as shown in Equation (11):

$$\tilde{r}_k^{i,(I+1)} = \begin{cases} \tilde{r}_k^{i,(I=0)} + \sum_{l=G+k+1}^{L} \hat{h}_l^{(J)} \hat{x}_{(k-l)_N}^{i,(I)}, & 0 \le k < L-G \\ \tilde{r}_k^{i,(I=0)}, & L-G \le k < N \end{cases} \quad (11)$$

As noted from Equation (11), the estimate of the $i^{th}$ recovered symbol sequence, $\{\hat{x}_k^{i,(I=0)}\}_{k=0}^{N-1}$ is used in the cyclicity restoration. An estimate of the frequency-domain current received symbol, that is, an $i^{th}$ recovered symbol sequence estimate $\{\hat{X}_n^{i,(I+1)}\}_{n=0}^{N-1}$ is acquired from $\{\tilde{r}_k^{i,(I+1)}\}_{k=0}^{N-1}$ woth the ICI signal component cancelled by Equation (11). Then $\{\hat{X}_n^{i,(I+1)}\}_{n=0}^{N-1}$ is converted to a time-domain recovered sequence estimate $\{\hat{x}_k^{i,(I+1)}\}_{k=0}^{N-1}$ in steps 322 and 324.

In step 326, it is determined whether the cyclicity restoration has been iterated $N_I$ times ($I=N_I$). If the condition has not been fulfilled, I is incremented by 1, considering that the cyclicity restoration is to be further performed in step 328 and steps 320 to 326 are repeated. On the other hand, if the condition has been fulfilled, channel estimation is performed according the present invention, considering that the cyclicity restoration has been fully carried out in step 330. The channel estimation is done according to equation (12):

$$\hat{h}_i^{(J+1)} = (E[\gamma_i^H \gamma_i | r_i, \hat{h}_i^{(J)}])^{-1} E[\gamma_{i|ri}, \hat{h}_i^{(J)}]^H r_i \quad (12)$$

Upon completion of the channel estimation based on Equation (12), it is determined whether the channel estimation has been iterated as many times as desired by checking whether $J=N_J$ in step 332. If this condition has not been fulfilled, J is incremented by 1 in step 334 and steps 312 to 330 are repeated, considering that the channel estimation needs to be further performed. On the other hand, if the condition has been fulfilled, decoding of the received $i^{th}$ symbol sequence $r_k^i$ is now completed.

The above procedure of FIG. 3 is carried out for one received symbol. Since a plurality of symbols are usually successively received in the OFDM system, it is to be appreciated that the operation described by FIG. 3 is performed continuously for the individual received symbols.

2. CP Reconstruction

CP reconstruction according to the present invention is intended for an OFDM system using a plurality of transmit antennas. A major technique using a plurality of transmit antennas is STBC. Hence, CP reconstruction in an OFDM-STBC system will be described, although it is obvious to those skilled in the art that the CP reconstruction is applicable to any OFDM system using a plurality of transmit antennas other than the OFDM-STBC system.

Figure 4:
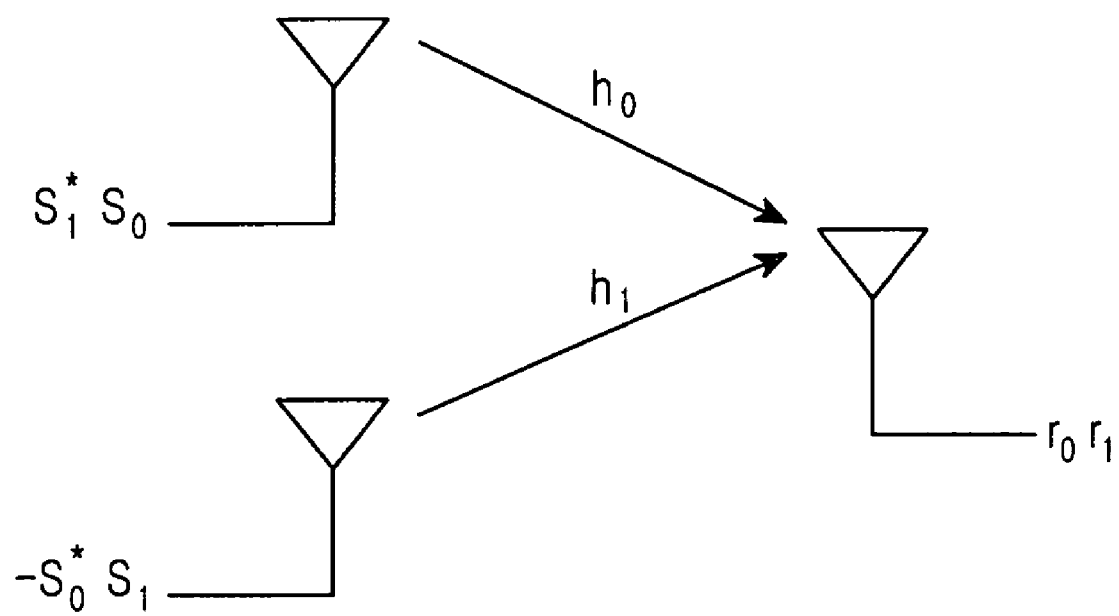
FIG. 4 conceptually illustrates a transmission signal and a received signal in an OFDM-STBC mobile communication system to which a CP reconstruction method is applied according to an embodiment of the present invention.

FIG. 4 conceptually illustrates a transmission signal and a received signal in an OFDM-STBC mobile communication system to which the CP reconstruction method is applied according to the present invention.

Referring to FIG. 4, symbols are transmitted in pairs ($s_0$ and $s_1$) according to an STBC scheme. The two symbols $s_0$ and $s_1$ are transmitted in the following pattern, as shown in Equation (13):

$$\begin{bmatrix} s_1^* & s_0 \\ -s_0^* & s_1 \end{bmatrix} \quad (13)$$

In the above signal matrix, $s_0$ and $s_1^*$ are transmitted sequentially through a first transmit antenna, and $s_1$ and $-s_0^*$ through a second transmit antenna.

CIRs exist between the transmit antennas and a receive antenna. The CIR of a channel between the first transmit antenna and the receive antenna is denoted by $h_0$ and the CIR of a channel between the second transmit antenna and the receive antenna is denoted by $h_1$ in FIG. 4. Thus, each of symbols $r_0$ and $r_1$ received at the receive antenna includes the CIRs $h_0$ and $h_1$.

Since the transmitter transmits symbols in pairs, the receiver also decodes received symbols in pairs $r_0$ and $r_1$. This implies that tail cancellation and cyclicity restoration are performed for each pair of symbols. Therefore, the CP reconstruction method according to the present invention involves tail cancellation and cyclicity restoration for each pair of received symbols. As stated before, tail cancellation is the process of canceling ISI and cyclicity restoration is the process of ICI cancellation.

In brief, the CP reconstruction method is divided into CP reconstruction of the former of two successive received symbols and CP reconstruction for the latter symbol. Let the two successive received symbols be denoted by $2i^{th}$ received symbol ($r_0$ in FIG. 4) and $(2i+1)^{th}$ received symbol ($r_1$ in FIG. 4). The $2i^{th}$ and $(2i+1)^{th}$ received symbols are called the former and latter symbols, respectively.

The CP reconstruction is branched into tail cancellation and cyclicity restoration for each of the two symbols.

For the $2i^{th}$ received symbol, tail cancellation is performed once and cyclic restoration is iterated. The tail cancellation cancels an ISI signal component by a general RISIC using the final symbol estimate of a plurality of received symbols previous to the $2i^{th}$ and $(2i+1)^{th}$ received symbols. The final symbol estimate is the estimate of a $(2i-1)^{th}$ received symbol. Therefore, the estimate of the $2i^{th}$ received symbol is affected by the tail cancellation only at an initial estimation and by the cyclic restoration at the other iterative estimations.

Tail cancellation is iterated for the $(2i+1)^{th}$ received symbol each time the channel estimate of the $2i^{th}$ received symbol is updated, and cyclicity restoration is also iterated for the $(2i+1)^{th}$ received symbol each time its channel estimate is updated. It thus follows that cyclic restoration is not performed for the $(2i+1)^{th}$ received symbol at an initial channel estimation.

Now a detailed description will be made of the CP reconstruction method according to the present invention.

Let a symbol sequence transmitted through a $p^{th}$ transmit antenna during an $m^{th}$ OFDM symbol period be denoted by $\{X_n^{p,m}\}_{n=0}^{N-1}$. An STBC encoder generates code symbols $X_n^{p,m}$ as follows, according to Equation (14)

$$\begin{bmatrix} X_n^{1,2i} & X_n^{1,2i+1} \\ X_n^{2,2i} & X_n^{2,2i+1} \end{bmatrix} = \begin{bmatrix} D_n^{1,i} & D_n^{2,i*} \\ D_n^{2,i} & -D_n^{1,i*} \end{bmatrix} \quad (14)$$

where p=1 and 2 denote the indexes of transmit antennas, m=2i and 2i+1 denote the indexes of OFDM symbol periods, and $D^i = [D_0^{1,i}, D_1^{1,i}, \ldots, D_{N-1}^{1,i}, D_0^{2,i}, D_1^{2,i}, \ldots, D_{N-1}^{2,i}]$ denote information vectors transmitted during the $2i^{th}$ and $(2i+1)^{th}$ OFDM symbol periods.

The frequency-domain transmission symbol sequence $\{x_n^{p,m}\}_{n=0}^{N-1}$ is converted to a time-domain transmission symbol sequence $\{x_k^{p,m}\}_{k=0}^{N-1}$.

In the OFDM-STBC system, the $2i^{th}$ received symbol $r_k^{2i}$ is given as Equation (15):

$$r_k^{2i} = \begin{cases} \sum_{p=1}^{2}\sum_{l=0}^{G+k} h_l^p x_{(k-l)_N}^{p,2i} + \sum_{p=1}^{2}\sum_{l=G+k+1}^{L} h_l^p x_{(k-l+G)_N}^{p,2i-1} + n_k^{2i}, & -G \leq k < L-G \\ \sum_{p=1}^{2}\sum_{l=0}^{L} h_l^p x_{(k-l)_N}^{p,2i} + n_k^{2i}, & L-G \leq k < N \end{cases} \quad (15)$$

where $h_l^p$ denotes the $l^{th}$ tap of the CIR between the receive antenna and the $p^{th}$ transmit antenna.

The $(2j+1)^{th}$ received symbol $r_k^{2i+1}$ is defined as Equation (16):

$$r_k^{2i+1} = \begin{cases} \sum_{p=1}^{2}\sum_{l=0}^{G+k} h_l^p x_{(k-l)_N}^{p,2i+1} + \sum_{p=1}^{2}\sum_{l=G+k+1}^{L} h_l^p x_{(k-l+G)_N}^{p,2i} + n_k^{2i+1}, & -G \leq k < L-G \\ \sum_{p=1}^{2}\sum_{l=0}^{L} h_l^p x_{(k-l)_N}^{p,2i+1} + n_k^{2i+1}, & L-G \leq k < N \end{cases} \quad (16)$$

By the CP reconstruction method according to the present invention, $\tilde{r}_k^{2i}$ and $\tilde{r}_k^{2i+1}$ are estimated from $r_k^{2i}$ and $r_k^{2i+1}$, respectively. Like the general RISIC, the CP reconstruction method involves tail cancellation and cyclicity restoration in case of a CP of insufficient length.

$\tilde{r}_k^{2i}$ is computed through tail cancellation and cyclicity restoration of $r_k^{2i}$ according to Equation (17):

$$\tilde{r}_k^{2i} = r_k^{2i} - \sum_{p=1}^{2}\sum_{l=G+k+1}^{L} h_l^p x_{(k-l+G)_N}^{p,2i-1} + \sum_{p=1}^{2}\sum_{l=G+k+1}^{L} h_l^p x_{(k-l)_N}^{p,2i}, \quad (17)$$

$$0 \leq k < L-G$$

where $r_k^{2i} - \sum_{p=1}^{2}\sum_{l=G+k+1}^{L} h_l^p x_{(k-l+G)_N}^{p,2i-1}$ corresponds to tail cancellation for canceling an ISI signal component from $r_k^{2i}$ and addition of $$\sum_{p=1}^{2}\sum_{l=G+k+1}^{L} h_l^p x_{(k-l)_N}^{p,2i}$$

corresponds to cyclic restoration for canceling an ICI signal component from $r_k^{2i}$.

$\tilde{r}_k^{2i+1}$ is computed through tail cancellation and cyclicity restoration of $r_k^{2i+1}$ according to Equation (18):

$$\tilde{r}_k^{2i+1} = \quad (18)$$

$$r_k^{2i+1} - \sum_{p=1}^{2}\sum_{l=G+k+1}^{L} h_l^p x_{(k-l+G)_N}^{p,2i} + \sum_{p=1}^{2}\sum_{l=G+k+1}^{L} h_l^p x_{(k-l)_N}^{p,2i+1},$$

$$0 \leq k < L-G$$

where $r_k^{2i+1} - \sum_{p=1}^{2}\sum_{l=G+k+1}^{L} h_l^p x_{(k-l+G)_N}^{p,2i}$ corresponds to tail cancellation for canceling an ISI signal component from $r_k^{2i+1}$ and addition of $$\sum_{p=1}^{2}\sum_{l=G+k+1}^{L} h_l^p x_{(k-l)_N}^{p,2i+1}$$

corresponds to cyclic restoration for canceling an ICI signal component from $r_k^{2i+1}$.

Equation (17) and Equation (18) reveal that tail cancellation is performed on $\{r_k^{2i}\}_{k=0}^{N-1}$ and $\{r_k^{2i+1}\}_{k=0}^{N-1}$ in different manners. While the estimate of the $(2i-1)^{th}$ recovered sequence, $\{\hat{x}_k^{p,2i-1}\}_{k=0}^{N-1}$ is used for tail cancellation of $\{r_k^{2i}\}_{K=0}^{N-1}$, tail cancellation is iterated for $\{r_k^{2i+1}\}_{k=0}^{N-1}$ using a $2i^{th}$ recovered sequence estimate $\{\hat{x}_k^{p,2i}\}_{k=0}^{N-1}$. This is because the $2i^{th}$ and $(2i+1)^{th}$ received symbol sequences are recovered simultaneously by STBC combining.

Figure 5:
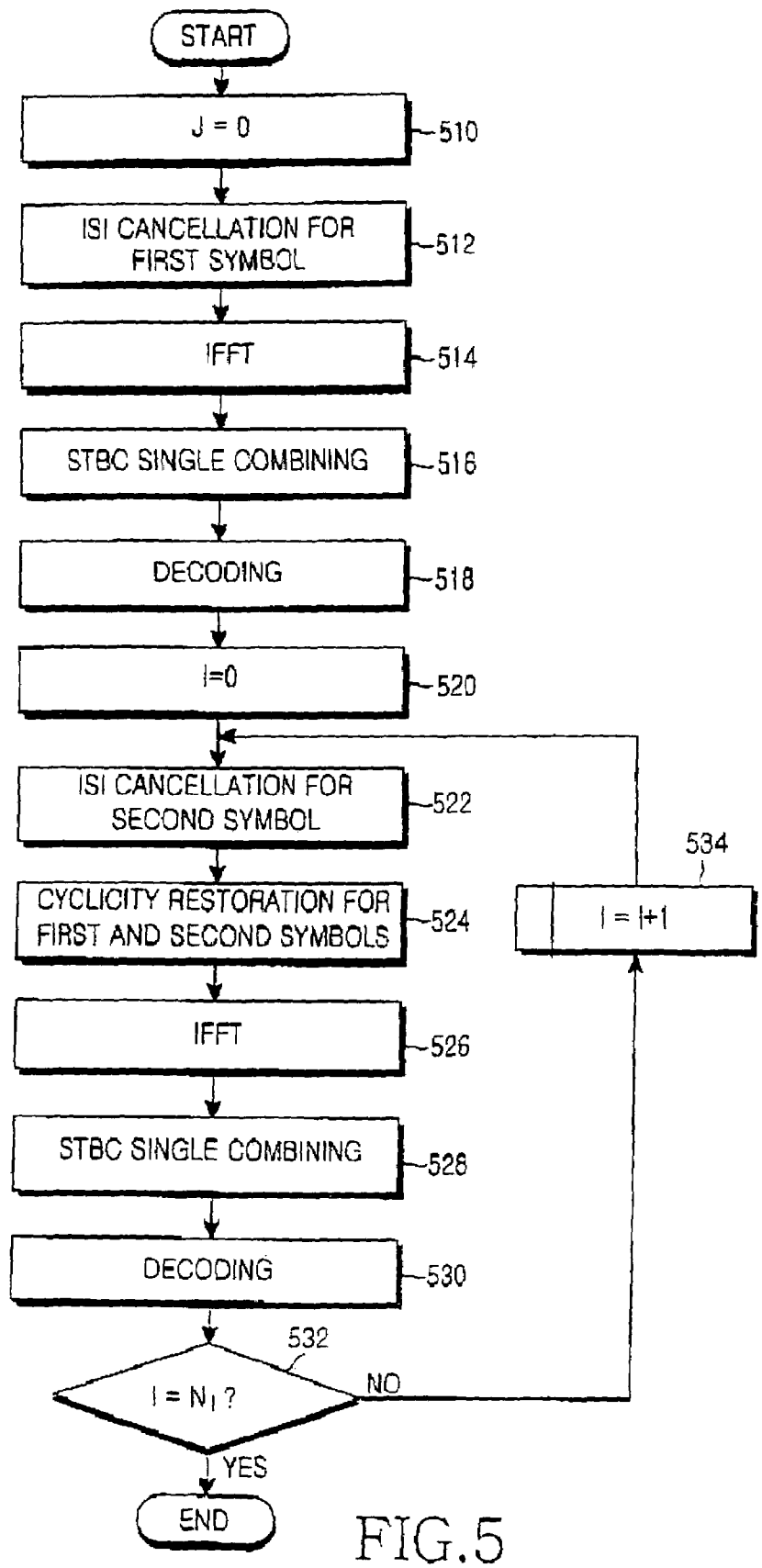
FIG. 5 is a flowchart illustrating a control operation for reconstructing a CP in the OFDM-STBC mobile communication system according to an embodiment of the present invention.

FIG. 5 is a flowchart illustrating a control operation for CP reconstruction in the OFDM-STBC mobile communication system according to the present invention. As noted from FIG. 5, tail cancellation is iterated for $\{r_k^{2i+1}\}_{k=0}^{N-1}$ as well as cyclicity restoration is iterated for both $\{r_k^{2i}\}_{k=0}^{0N-1}$ and $\{r_k^{2i+1}\}_{k=0}^{N-1}$. Hereinbelow, two received STBC symbol sequences $\{r_k^{2i}\}_{k=0}^{N-1}$ and $\{r_k^{2i+1}\}_{k=0}^{N-1}$ are called first and second symbol sequences, respectively.

Referring to FIG. 5, in step 510, a previous frequency-domain recovered symbol sequence estimate $\{\hat{X}_n^{2i-1}\}_{n=0}^{N-1}$ is converted to a time-domain recovered sequence estimate $\{\hat{x}_k^{2i-1}\}_{k=0}^{N-1}$. An ISI signal component is cancelled from the first symbol sequence $\{k_k^{2i}\}_{k=0}^{N-1}$ using $\{\hat{x}_k^{2i-1}\}_{k=0}^{N-1}$ at step 512. Since $\{\hat{x}_k^{2i-1}\}_{k=0}^{N-1}$ can be distinguished according to the transmit antennas, it is now expressed as $\{\hat{x}_k^{p,2i-1}\}_{k=0}^{N-1}$ with the transmit antenna index p used therein. The ISI cancellation from $\{r_k^{2i}\}_{k=0}^{N-1}$ is expressed as Equation (19):

$$\tilde{r}_k^{2i} = \begin{cases} r_k^{2i} - \sum_{p=1}^{2}\sum_{l=G+k+1}^{L} h_l^p x_{(k-l+G)_N}^{p,2i-1}, & 0 \leq k < L-G \\ r_k^{2i}, & L-G \leq k < N \end{cases} \quad (19)$$

where $h_l^p$ denotes the $l^{th}$ tap of the CIR between the $p^{th}$ transmit antenna and the receive antenna. The final estimate of the $(2i-1)^{th}$ recovered symbol sequence $x_{(k-K+G)_N}^{p,2i-1}$ is used in achieving an initial estimate of the first recovered symbol sequence in Equation (19). Because $k_{(k-L+G)_N}^{p,2i-1}$ is a known fixed value, tail cancellation is performed only once for the first symbol sequence.

At an initial estimation (l=0), cyclic restoration is not available since a recovered sequence estimate of $\{r_k^{2i}\}_{k=0}^{N-1}$ is yet to be obtained. Therefore, a frequency-domain estimate of a $2i^{th}$ recovered symbol sequence, $\{\hat{X}_n^{p,2i,(l=0)}\}_{n=0}^{N-1}$ is computed from $\{\tilde{r}_k^{2i,(l=0)}\}_{k=0}^{N-1}$ and $\{\tilde{r}_k^{2i,(l=0)}\}_{k=0}^{N-1}$ is converted to a time-domain estimate of the $2i^{th}$ recovered symbol sequence, $\{\hat{x}_k^{p,2i,(l=0)}\}_{k=0}^{N-1}$ in steps 514, 516 and 518. At the same time, STBC single combining is performed. In step 520, l is set to an initial value 0. l is a parameter indicating the iteration count of tail cancellation for the second symbol sequence and cyclicity restoration for the first and second symbol sequences. Step 520 may precede the tail cancellation of the first symbol sequence.

In steps 522 to 534, tail cancellation is iterated $N_I$ times for the second symbol sequence and cyclicity restoration is iterated $N_I$ times for the first and second symbol sequences. These iterative tail cancellations and cyclicity restorations enable accurate estimation of the first and second symbol sequences. $\{\hat{x}_k^{p,2i}\}_{k=0}^{N-1}$ acquired from the first symbol sequence is used in the tail cancellation of the second symbol sequence and the cyclicity restoration of the first symbol sequence. $\{\hat{x}_k^{p,2i+1}\}_{k=0}^{N-1}$ acquired from the second symbol sequence is used in the cyclicity restoration of the second symbol sequence.

To be more specific, tail cancellation is performed for the second symbol sequence $\{r_k^{2i+1}\}_{k=0}^{N-1}$ in step 522, according to Equation (20):

$$\tilde{r}_k^{2i+1} = \begin{cases} r_k^{2i+1} - \sum_{p=1}^{2}\sum_{l=G+k+1}^{L} h_l^p x_{(k-l+G)_N}^{p,2i}, & 0 \le k < L-G \\ r_k^{2i+1}, & L-G \le k < N \end{cases} \quad (20)$$

where $h_l^p$ denotes the $l^{th}$ tap of the CIR between the $p^{th}$ transmit antenna and the receive antenna. In Equation (20), an estimated recovered sequence $\{\hat{x}_k^{p,2i}\}_{k=0}^{N-1}$ acquired from $\{r_k^{2i}\}_{k=0}^{N-1}$ is used for the tail cancellation of $\{r_k^{2i+1}\}_{k=0}^{N-1}$. Thus, the tail cancellation of $\{r_k^{2i+1}\}_{k=0}^{N-1}$ is iterated each time $\{\hat{x}_k^{p,2i}\}_{k=0}^{N-1}$ is updated.

Upon completion of the tail cancellation of $\{\hat{x}_k^{p,2i}\}_{k=0}^{N-1}$, cyclic restoration is performed on $\{r_k^{2i}\}_{k=0}^{N-1}$ and $\{r_k^{2i+1}\}_{k=0}^{N-1}$ in step 524.

During the cyclic restoration of $\{r_k^{2i}\}_{k=0}^{N-1}$, an ICI signal component $$\sum_{p=1}^{2}\sum_{l=G+k+1}^{L} h_l^p x_{(k-l)_N}^{p,2i}$$

is added to $$\tilde{r}_k^{2i} = r_k^{2i} - \sum_{p=1}^{2}\sum_{l=G+k+1}^{L} h_l^p x_{(k-l+G)_N}^{p,2i-1}$$

resulting from the tail cancellation of step 512. While $\{\hat{x}_k^{p,2i,(l=0)}\}_{k=0}^{N-1}$ is used at an initial cyclic restoration, an estimated recovered sequence $\{\hat{x}_k^{p,2i,(l\ne0)}\}_{k=0}^{N-1}$ obtained at the previous cyclic restoration is used at each of the other iterative cyclic restorations.

During the cyclic restoration of $\{r_k^{2i+1}\}_{k=0}^{N-1}$, an ICI signal component $$\sum_{p=1}^{2}\sum_{l=G+k+1}^{L} h_l^p x_{(k-l)_N}^{p,2i+1}$$

is added $$\tilde{r}_k^{2i+1} = r_k^{2i+1} - \sum_{p=1}^{2}\sum_{l=G+k+1}^{L} h_l^p x_{(k-l+G)_N}^{p,2i}$$

resulting from the tail cancellation of step 522. No cyclic restoration is performed if an estimated recovered sequence of the second symbol sequence does not exist. An estimated recovered sequence $\{\hat{x}_k^{p,2i+1,(l\ne0)}\}_{k=0}^{N-1}$ acquired from the previous cyclic restoration is used for each iterative cyclic restoration.

In steps 526 to 530, a recovered first symbol sequence estimate $\{\hat{X}_n^{p,2i,(l\ne0)}\}_{n=0}^{N-1}$ and a recovered second symbol sequence estimate $\{\hat{X}_n^{p,2i+1,(l\ne0)}\}_{n=0}^{N-1}$ are calculated from $\{\tilde{r}_k^{2i}\}_{k=0}^{N-1}$ and $\{\tilde{r}_k^{2i+1}\}_{k=0}^{N-1}$, respectively and converted to time-domain recovered sequence estimates $\{\hat{x}_k^{p,2i,(l\ne0)}\}_{k=0}^{N-1}$ and $\{\hat{x}_k^{p,2i+1,(l\ne0)}\}_{k=0}^{N-1}$. At the same time, STBC single combining is performed.

In step 532, it is determined whether the tail cancellation of the second symbol sequence and the cyclicity restoration of the first and second symbol sequences have happened $N_I$ times by comparing I with $N_I$. If I is not equal to $N_I$, l is incremented by 1 in step 534 and steps 522 to 530 are repeated. During these steps, updated $\{\hat{x}_k^{p,2i,(l\ne0)}\}_{k=0}^{N-1}$ and $\{\hat{x}_k^{p,2i+1,(l\ne0)}\}_{k=0}^{N-1}$ are used. On the contrary, if I is equal to $N_I$, the tail cancellation and cyclicity restoration for $\{r_k^{2i}\}_{k=0}^{N-1}$ and $\{r_k^{2i+1}\}_{k=0}^{N-1}$ are completed.

As described above, the CP reconstruction according to the present invention is carried out for each pair of received symbols. For this purpose, while tail cancellation is performed for the first symbol sequence in the same manner as the general RISIC, cyclicity restoration is iterated for the first and second symbol sequences and tail cancellation is iterated for the second symbol sequence, a predetermined number of times.

The CP reconstruction and channel estimation of the present invention can be implemented in combination. A control operation for performing the CP reconstruction and the channel estimation in combination is illustrated in FIG. 6.

Figure 6:
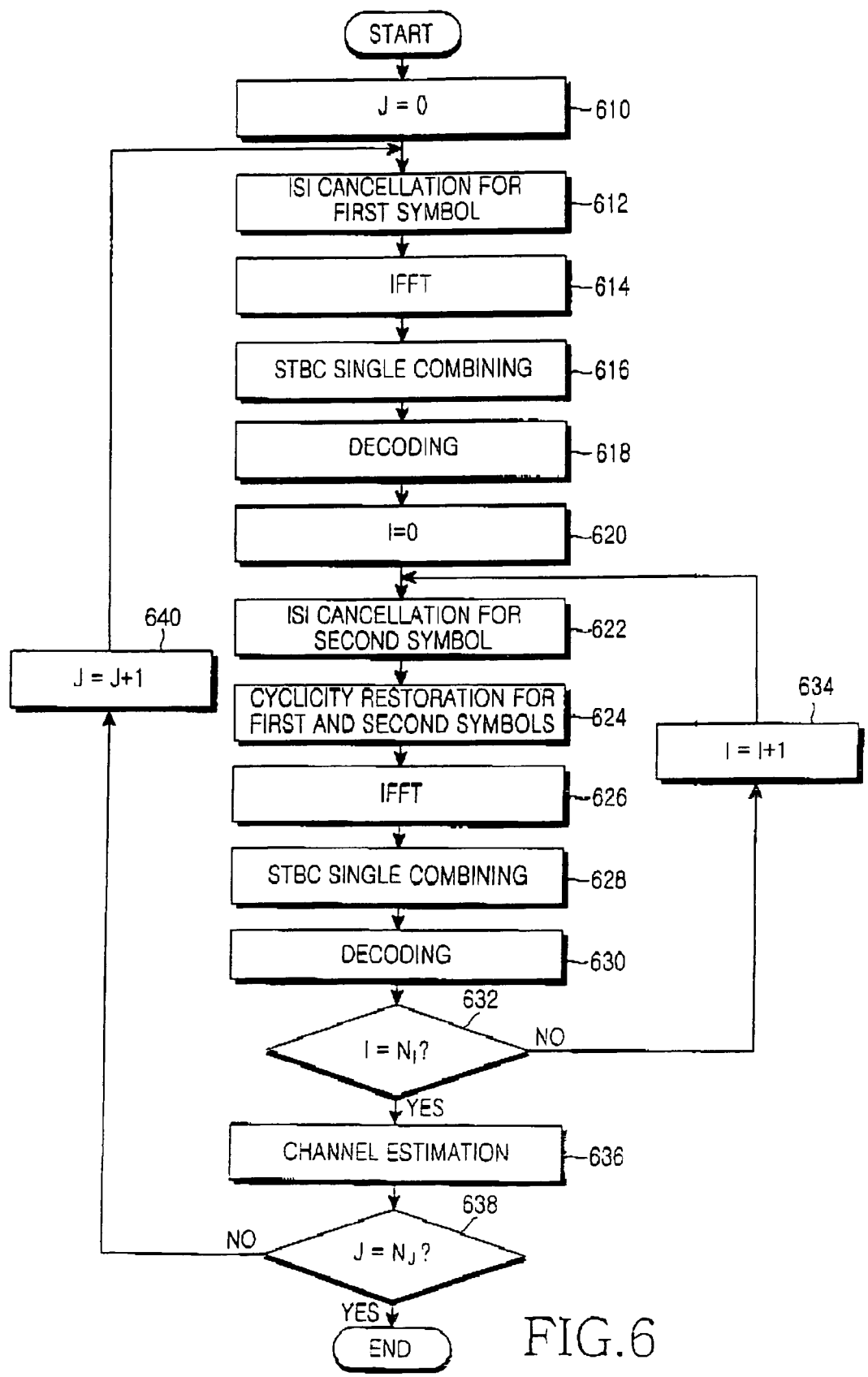
FIG. 6 is a flowchart illustrating a control operation for performing CP reconstruction and channel estimation in combination according to an embodiment of the present invention.

Referring to FIG. 6, steps 612 to 634 are performed in the same manner as steps 512 to 534 illustrated in FIG. 5, and a channel estimation step is characteristically added according to the present invention. In steps 610, 638 and 640, it is determined whether channel estimation has been iterated a predetermined number of times, and in step 636, channel estimation is performed. Steps 610, 638 and 640 correspond to steps 310, 332 and 334 illustrated in FIG. 3. Also, step 636 corresponds to step 330 of FIG. 3. Upon completion of CP reconstruction for a pair of received symbols, channel estimation is performed and then the CP reconstruction is iterated. The CP reconstruction using an accurate channel estimate leads to recovery of optimum symbol sequences.

3. Improved Complexity

Four independent IFFT processes are required for the CP reconstruction and channel estimation in the OFDM-STBC system according to the present invention. As noted from Equation (12), Equation (17) and Equation (18), four time-domain recovered sequence estimates $\{\hat{x}_k^{p,m}\}_{k=0}^{N-1}$ (p=1,2, m=2i, 2i+1) are created using the IFFT processes. However, subchannels are in the following relationship in the OFDM-STBC system, as shown in Equation (21):

$X_n^{1,2i+1} = X_n^{2,2i*}$, $X_n^{2,2i+1} = -X_n^{1,2i*}$ \hfill (21)

and a typical Fourier transform relationship is given as Equation (22):

$$x_{(-k)_N}^* \Leftrightarrow X_n^*, \quad n,k=0,1,\ldots,N-1 \qquad (22)$$

Using Equation (21) and Equation (22), two time-domain sequences $\{\hat{x}_k^{p,2i+1}\}_{k=0}^{N-1}$ (p=1,2) are easily derived from the other two time-domain sequences $\{\hat{x}_k^{p,2i}\}_{k=0}^{N-1}$ (p=1,2) by sign conversion and reordering. For example, as shown in Equation (23):

$$\hat{x}_k^{1,2i+1} = \hat{x}_{(-k)_N}^{2,2i*},$$

$$\hat{x}_k^{2,2i+1} = -\hat{x}_{(-k)_N}^{1,2i*} \qquad (23)$$

where k=0, 1, ..., N-1.

Figure 7:
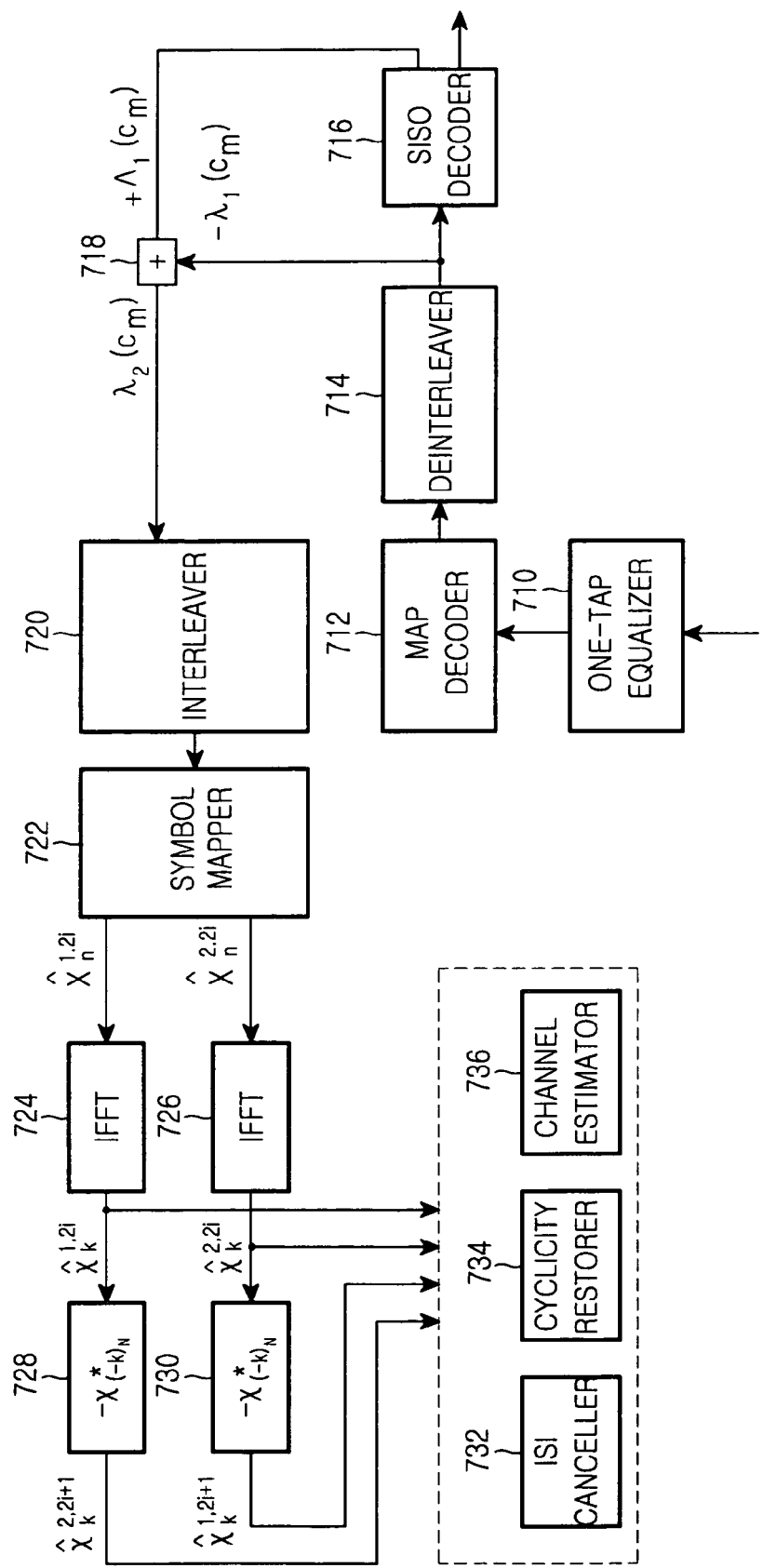
FIG. 7 is a block diagram of a receiver for minimizing complexity caused by the CP reconstruction and the channel estimation in the OFDM-STBC mobile communication system according to an embodiment of the present invention.

FIG. 7 is a block diagram of a receiver for minimizing complexity caused by the CP reconstruction and the channel estimation in the OFDM-STBC mobile communication system according to the present invention. In FIG. 7, two of four IFFT processes each are replaced by complex conjugation and reordering according to the present invention. While the components from the antenna to the first equalizer of FIG. 2 are not shown in FIG. 7, it is obvious to those skilled in the art that they can be implemented in the same configurations in the receiver illustrated in FIG. 7. Therefore, the following description focuses on an operation for creating estimates of four time-domain recovered sequences, $\{\hat{x}_k^{p,m}\}_{k=0}^{N-1}$ (p=1,2 and m=2i,2i+1) using estimates of first and second frequency-domain recovered sequences output from a symbol mapper 722.

Referring to FIG. 7, the signal mapper 722 outputs frequency-domain recovered sequence estimates of the first and second symbols, $\hat{X}_n^{1,2i}$ and $\hat{X}_n^{2,2i}$. A first IFFT processor 724 converts $\hat{X}_n^{1,2i}$ to a time-domain recovered sequence estimate of the first symbol, $\hat{x}_k^{1,2i}$. A second IFFT processor 726 converts $\hat{X}_n^{2,2i}$ to a time-domain recovered sequence estimate of the second symbol, $\hat{x}_k^{2,2i}$.

A first sign converter and reorderer 728 obtains $-\hat{x}_{(-k)_N}^{1,2i*}$ through sign conversion and reordering of $\hat{x}_k^{1,2i}$ and outputs $-\hat{x}_{(-k)_N}^{1,2i*}$ as $\hat{x}_k^{2,2i+1}$. A second sign converter and reorderer 730 obtains $\hat{x}_{(-k)_N}^{2,2i*}$ through sign conversion and reordering of $\hat{x}_k^{2,2i}$ and outputs $\hat{x}_{(-k)_N}^{2,2i*}$ as $\hat{x}_k^{1,2i+1}$.

For the input of $\hat{x}_k^{1,2i}$ and $\hat{x}_k^{2,2i}$, an ISI canceller 732 cancels an ISI signal component from the second symbol sequence $r_k^{2i+1}$ by tail cancellation according to Equation (20). A cyclicity restorer 734 restores ICI signal components for the first and second symbol sequences $r_k^{2i}$ and $r_k^{2i+1}$ using the received $\hat{x}_k^{1,2i}$, $\hat{x}_k^{2,2i}$, $\hat{x}_k^{1,2i+1}$ ($=\hat{x}_{(-k)_N}^{2,2i*}$), and $\hat{x}_k^{2,2i+1}$ ($=-\hat{x}_{(-k)_N}^{1,2i*}$), by cyclicity restoration. That is, the ISI canceller 732 and the cyclicity restorer 734 compute estimates of the first and second symbol sequences, $\{\hat{r}_k^{2i}\}_{k=0}^{N-1}$ and $\{\hat{r}_k^{2i+1}\}_{k=0}^{N-1}$ using $\hat{x}_k^{1,2i}$, $\hat{x}_k^{2,2i}$, $\hat{x}_k^{1,2i+1}$ ($=\hat{x}_{(-k)_N}^{2,2i*}$), and $\hat{x}_k^{2,2i+1}$ ($=-\hat{x}_{(-k)_N}^{1,2i*}$) according to Equation (17) and Equation (18).

In this way, two of four IFFT processes each are replaced with complex conjugation and reordering. The resulting saving of two IFFT processes decreases receiver complexity.

4. Simulation Results

The simulation results described below were achieved under the conditions of Quadrature Phase Shift Keying (QPSK), 64 subchannels, a rate 1/2 convolutional code with K=7, and an S-random interleaver with S=5.

Figure 8:
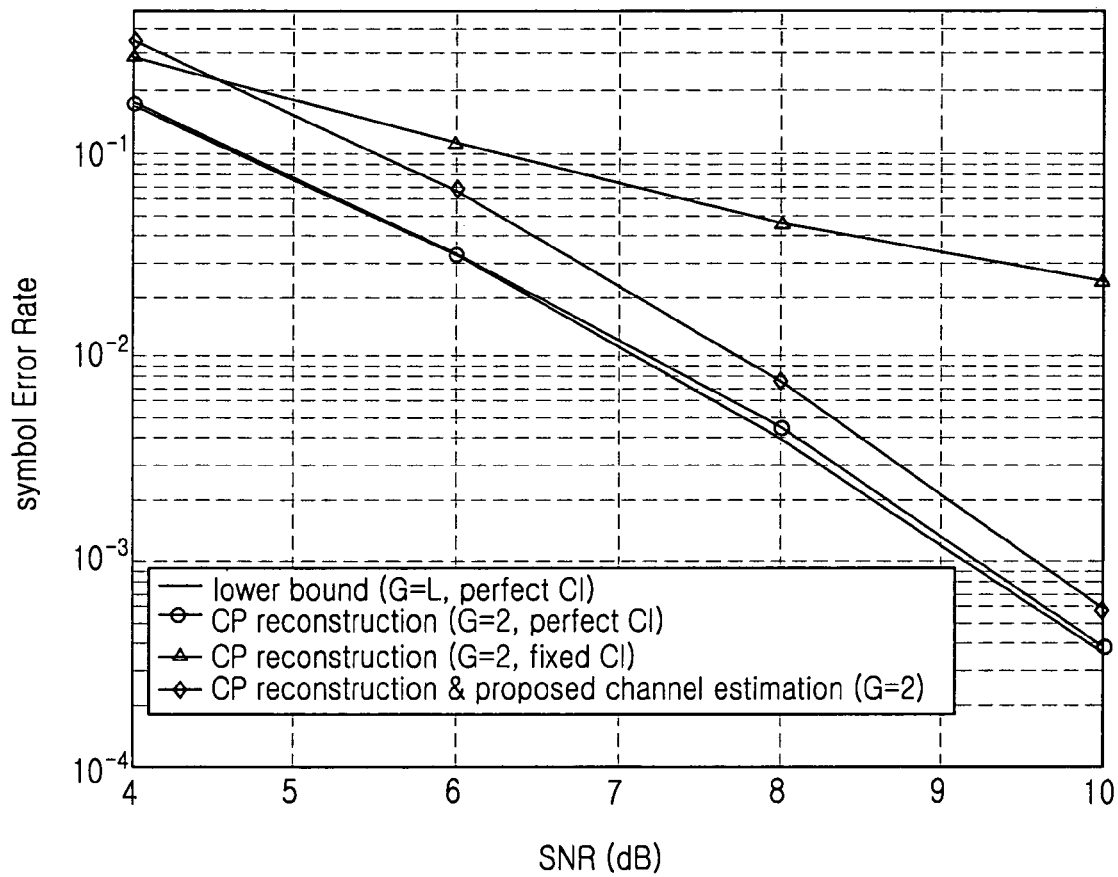
FIG. 8 is a graph illustrating performance in terms of symbol error rate per frame at a normalized Doppler frequency of 0.01.

FIG. 8 is a graph illustrating performance in terms of symbol error rate per frame at a normalized Doppler frequency (fdTs) of 0.01. It is assumed herein that one frame includes one training symbol period and nine data symbol periods. A channel length L is 7 and a Rayleigh fading channel which travels in eight paths with exponentially decreasing power is used. The iteration numbers of CP reconstruction and channel estimation according to the present invention are equally 2.

Referring to FIG. 8, a plain solid line denotes a performance bound, that is, symbol error rates achieved in case of CP samples (G=L) of sufficient length and accurate channel information. A solid line with circles denotes symbol error rates achieved in case of CP samples (G=2) of insufficient length and CP reconstruction. In this case, the CP reconstruction performance is almost identical to the performance bound.

A solid line with triangles shows the performance of CP reconstruction without channel estimation. Since channel information achieved from the training period is still used for the data periods, an error floor is observed due to fast change of the channel.

Finally, a solid line with diamonds shows the performance of CP reconstruction with channel estimation according to the present invention. Despite the fast changing channel, no error floor occurs and remarkable performance improvement is achieved compared to the CP reconstruction without channel estimation.

Figure 9:
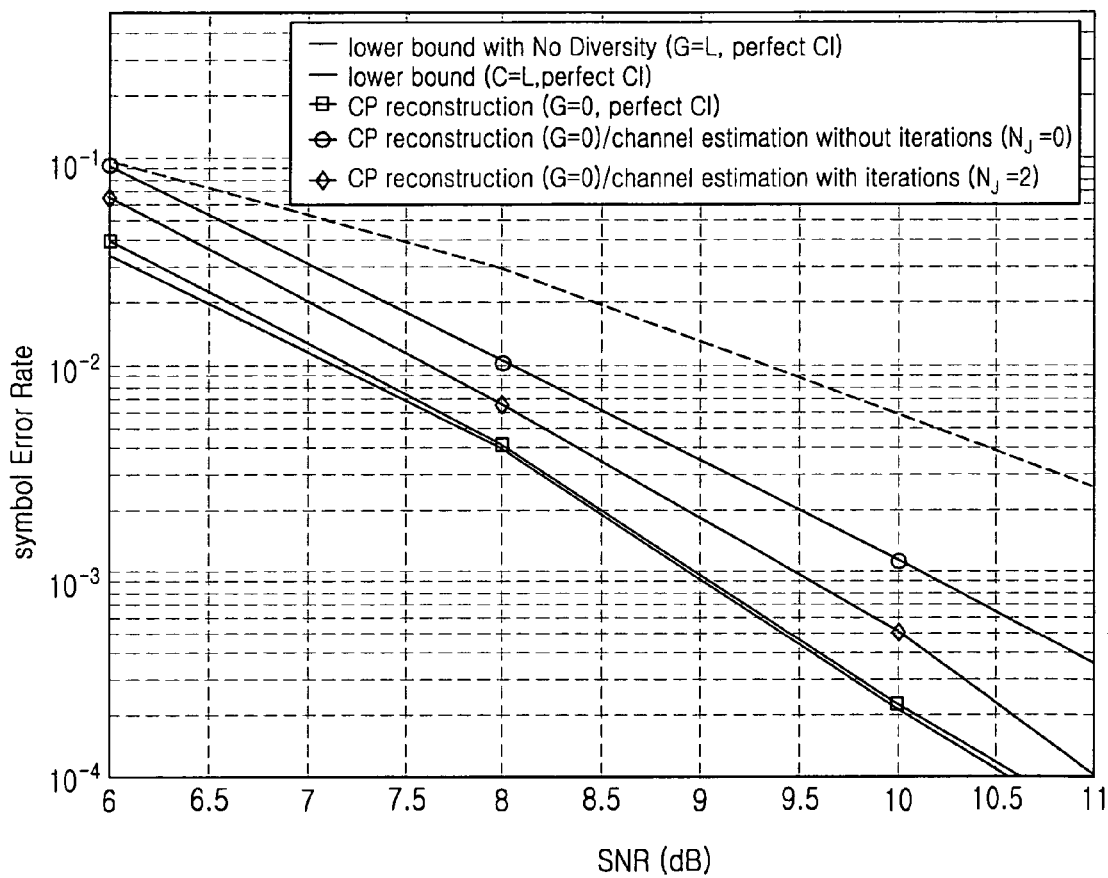
FIG. 9 is a graph illustrating the performance of the CP reconstruction in case of a Typical Urban (TU) channel according to the embodiment of the present invention.

FIG. 9 is a graph illustrating the performance of the CP reconstruction on a TU channel according to the present invention. The simulation conditions are a normalized Doppler frequency (fdTs) of 0.001 and a symbol period of 40 μs. Therefore, the length of the TU channel L is 8. In the OFDM-STBC system, one frame includes one STBC training symbol pair (i.e. two OFDM symbol periods) and nine data symbol pairs (i.e. 18 OFDM data symbol periods).

Referring to FIG. 9, a dotted line and a plain solid line show symbol error performance in the case of having sufficient CP samples (G=L) and accurate channel information. Specifically, the dotted line denotes a performance bound in an existing OFDM system using one transmit antenna and the plain solid line denotes a performance bound in an OFDM-STBC system. As noted from the graph, diversity gain is achieved by STBC.

A solid line with squares shows the performance of CP reconstruction in the case of a CP (G=0) of insufficient length in the OFDM-STBC system according to the present invention. It is revealed that performance is almost the same in both the OFDM-STBC system using CP reconstruction according to the present invention and the OFDM-STBC system using a CP of sufficient length. Consequently, the inventive CP reconstruction technique improves the frequency efficiency of the OFDM-STBC system by 11.11%. The frequency efficiency gain is computed by Equation (24):

$$\frac{N}{N+G}\bigg|_{N=64,G=0} - \frac{N}{N+G}\bigg|_{N=64,G=L=8} = 11.11\% \qquad (24)$$

A solid line with circles shows symbol error performance in the case where iterative channel estimation is not performed in the OFDM-STBC system, and a solid line with diamonds shows symbol error performance in the case of iterative channel estimation according to the present invention. When channel estimations are iterated twice, a 0.6-dB performance increase is achieved at a symbol error rate of $10^{-3}$.

As described above, the present invention advantageously minimizes a frequency efficiency decrease caused by insertion of CP samples, without reducing diversity gain in an OFDM-STBC system. Furthermore, the improved frequency efficiency brings an increase in a total data rate in the OFDM system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of receiving signals in an orthogonal frequency division multiplexing (OFDM) mobile communication system using at least two transmit antennas and one receive antenna, comprising the steps of:
   (a) acquiring a final recovered sequence estimate of previous received symbols;
   (b) canceling an inter-symbol interference (ISI) signal component from a first received symbol sequence by using the final recovered sequence estimate;
   (c) acquiring a first recovered sequence estimate of the ISI-cancelled first received symbol sequence;
   (d) simultaneously recovering an inter-carrier interference (ICI) signal component from the ISI-cancelled first received symbol sequence and canceling an ISI signal component from a second received symbol sequence, in which the second received symbol sequence is received next to the first received symbol sequence by using the first recovered sequence estimate;
   (e) acquiring a second recovered sequence estimate of the ISI-cancelled second received symbol sequence; and
   (f) recovering an ICI signal component from the ISI-cancelled second received symbol sequence by using the second recovered sequence estimate,
   wherein the first received symbol sequence is received at a first time period and the second received symbol sequence is received at a second time period later than the first time period, and steps (c) to (f) are iterated a predetermined number of times.

2. The method of claim 1, wherein the cancellation of the ISI signal component $$\sum_{p=1}^{2} \sum_{l=G+k+1}^{L} h_l^p x_{(k-l+G)_N}^{p,2i-1}$$

and the recovery of the ICI signal component $$\sum_{p=1}^{2} \sum_{l=G+k+1}^{L} h_l^p x_{(k-l)_N}^{p,2i}$$

from the first received symbol sequence $r_k^{2i}$ are performed by $$\tilde{r}_k^{2i} = r_k^{2i} - \sum_{p=1}^{2} \sum_{l=G+k+1}^{L} h_l^p x_{(k-l+G)_N}^{p,2i-1} + \sum_{p=1}^{2} \sum_{l=G+k+1}^{L} h_l^p x_{(k-l)_N}^{p,2i}, \quad 0 \le k < L-G$$

where $\tilde{r}_k^{2i}$ is the ICI-recovered first received symbol sequence, $h_l^p$ is an $l^{th}$ tap of a channel impulse response (CIR) between a $p^{th}$ transmit antenna and the receive antenna, $x_{(k-l+G)_N}^{p,2i-I}$ is the final recovered sequence estimate of the previous received symbols, $x_{(k-l)_N}^{p,2i}$ is the first recovered symbol sequence estimate, and p is the index of a transmit antenna $(K)_N$ is K modulo N, L is the CIR length, and G is the Cyclic Prefix (CP) length.

3. The method of claim 2, wherein the cancellation of the ISI signal component $$\sum_{p=1}^{2} \sum_{l=G+k+1}^{L} h_l^p x_{(k-l+G)_N}^{p,2i}$$

and the recovery of the ICI signal component $$\sum_{p=1}^{2} \sum_{l=G+k+1}^{L} h_l^p x_{(k-l)_N}^{p,2i+1}$$

from the second received symbol sequence $r_k^{2i+I}$ are performed by $$\tilde{r}_k^{2i+1} = r_k^{2i+1} - \sum_{p=1}^{2} \sum_{l=G+k+1}^{L} h_l^p x_{(k-l+G)_N}^{p,2i} + \sum_{p=1}^{2} \sum_{l=G+k+1}^{L} h_l^p x_{(k-l)_N}^{p,2i+1},$$

$$0 \le k < L - G$$

where $\tilde{r}_k^{2i+I}$ is the ICI-recovered second received symbol sequence and $x_{(k-l)_N}^{p,2i+I}$ is the second recovered symbol sequence estimate.

4. The method of claim 3, wherein if the first and second received symbol sequences are training symbols, an estimate $\hat{h}_i$ of $h_i^p$ is calculated by $$\hat{h}_i = \underset{h_i}{\operatorname{argmin}} \|r_i - \gamma_i h_i\|^2$$

where $\gamma_i$ is a training symbol matrix transmitted during a training period, $r_i$ is a received symbol matrix, and $h_i$ is a previous channel estimate.

5. The method of claim 4, wherein if the first and second received symbol sequences are data symbols, an estimate $\hat{h}_i$ of $h_i^p$ is calculated by $$\hat{h}_i = \underset{h_i}{\operatorname{argmin}} E[\|r_i - \gamma_i h_i\|^2]$$

$$= (E[\gamma_i^H \gamma_i \mid r_i, h_i])^{-1} E[\gamma_i \mid r_i, h_i]^H r_i$$

where $E[x]$ is an expected value of a random variable x.

6. The method of claim 5, wherein $E[\gamma_l^H \gamma_{l|r_l} h_l]$ and $E[y_l|r_l, h_l]$ are calculated using an extrinsic probability of a soft-input soft-output (SISO) decoder and the final recovered sequence estimate of the previous received symbols $\{\hat{x}_k^{i-I}\}_{k=0}^{N-1}$.

7. The method of claim 1, wherein the second recovered symbol sequence estimate $x_{(k-l)_N}^{p,2i+I}$ is obtained by sign conversion and reordering of the first recovered symbol sequence estimate $x_{(k-l)_N}^{p,2i}$.

8. The method of claim 1, wherein the second recovered symbol sequence estimate $\hat{x}_{(k-l)_N}^{p,2i+I}$ is calculated using the first recovered symbol sequence estimate $\hat{x}_{(k-l)_N}^{p,2i}$ by $$\hat{x}_k^{1,2i+I} = \hat{x}_{(-k)_N}^{2,2i*},$$

$$\hat{x}_k^{2,2i+I} = -\hat{x}_{(-k)_N}^{1,2i*}$$

where p is 1 and 2 and k is 0, 1,..., N-1.

9. An apparatus for receiving signals in an orthogonal frequency division multiplexing (OFDM) mobile communication system using at least two transmit antennas and one receive antenna, comprising:
an inter-symbol interference (ISI) canceller for canceling an ISI signal component from a first received symbol sequence by using a final recovered sequence estimate of previous received symbols, and canceling an ISI signal component from a second received symbol sequence, in which the second received symbol sequence is received next to the first received symbol sequence, by using a first recovered sequence estimate of the ISI-cancelled first received symbol sequence;
a cyclicity restorer for recovering an inter-carrier interference (ICI) signal component from the ISI-cancelled first received symbol by using the first recovered sequence estimate of the first received symbol sequence and recovering an ICI signal component from the ISI-cancelled second received symbol sequence by using a second recovered sequence estimate of the second received symbol sequence; and
a recoverer for acquiring the first and the second recovered sequence estimates of the first received symbol sequence and the second received symbol sequence by decoding the ICI-recovered first and second received symbol sequences respectively,
wherein the first received symbol sequence is received at a first time period and the second symbol sequence is received at a second time period later than the first time period, and the operations of the ISI canceller, the cyclicity restorer, and the recoverer the are iterated a predetermined number of times.

10. The apparatus of claim 9, wherein the ISI canceller subtracts the ISI signal component $$\sum_{p=1}^{2}\sum_{l=G+k+1}^{L} h_l^p x_{(k-l+G)_N}^{p,2i-1}$$

from the first received symbol sequence $r_k^{2i}$ and subtracts the ISI signal component $$\sum_{p=1}^{2}\sum_{l=G+k+1}^{L} h_l^p x_{(k-l+G)_N}^{p,2i}$$

from the second received symbol sequence $r_k^{2i+1}$, $\tilde{r}_k^{2i}$ being the ICI-recovered first received symbol sequence, $h_l^p$ being an $l^{th}$ tap of a channel impulse response (CIR) between a $p^{th}$ transmit antenna and the receive antenna, $x_{(k-l+G)_N}^{p,2i-1}$ being the final recovered sequence estimate of the previous received symbols, $x_{(k-l)_N}^{p,2i}$ being the first recovered symbol sequence estimate, and p being the index of a transmit antenna (K)$_N$ is K modulo N, L is the CIR length, and G is the Cyclic Prefix (CP) length.

11. The apparatus of claim 10, wherein the cyclicity restorer adds a signal component $$\sum_{p=1}^{2}\sum_{l=G+k+1}^{L} h_l^p x_{(k-l)_N}^{p,2i}$$

to the ISI-cancelled first received symbol sequence and adds a ICI signal component $$\sum_{p=1}^{2}\sum_{l=G+k+1}^{L} h_l^p x_{(k-l)_N}^{p,2i+1}$$

to the ISI-cancelled second received symbol sequence, $x_{(k-l)_N}^{p,2i+1}$ being the second recovered symbol sequence estimate.

12. The apparatus of claim 11, further comprising a channel estimator for, if the first and second received symbol sequences are training symbols, calculating an estimate $\hat{h}_i$ of $h_i^p$ by $$\hat{h}_i = \underset{h_i}{\operatorname{argmin}} \|r_i - \gamma_i h_i\|^2$$

where $\gamma_i$ is a training symbol matrix transmitted during a training period, $r_i$ is a received symbol matrix, and $h_i$ is a previous channel estimate, and if the first and second symbol sequences are data symbols, calculating an estimate $\hat{h}_i$ of $h_i^p$ by $$\hat{h}_i = \underset{h_i}{\operatorname{argmin}} E[\|r_i - \gamma_i h_i\|^2]$$
$$= (E[\gamma_i^H \gamma_i | r_i, h_i])^{-1} E[\gamma_i | r_i, h_i]^H r_i$$

where E[x] is an expected value of a random variable x.

13. The apparatus of claim 12, wherein the channel estimator calculates $E[\gamma_i^H \gamma_i | r_i, h_i]$ and $E[\gamma_i | r_i, h_i]$ using an extrinsic probability of a soft-input soft-output (SISO) decoder and the final recovered sequence estimate of the previous received received symbols $\{\hat{x}_k^{i-1}\}_{k=0}^{N-1}$.

14. The apparatus of claim 9, wherein the recoverer acquires the second recovered symbol sequence estimate $x_{(k-l)_N}^{p,2i+1}$ by sign conversion and reordering of the first recovered symbol sequence estimate $x_{(k-l)_N}^{p,2i}$.

15. The apparatus of claim 9, wherein the recoverer acquires the second recovered symbol sequence estimate $\hat{x}_{(k-l)_N}^{p,2i+1}$ using the first recovered symbol sequence estimate $\hat{x}_{(k-l)_N}^{p,2i}$ by $$\hat{x}_k^{1,2i+1} = \hat{x}_{(-k)_N}^{2,2i*}$$

$$\hat{x}_k^{2,2i+1} = -\hat{x}_{(-k)_N}^{1,2i*}$$

where p is 1 and 2 and k is 0, 1, ..., N−1.

16. The apparatus of claim 15, wherein the recoverer comprises:
a first sign converter and reorder for outputting $-\hat{x}_{(-k)_N}^{1,2i*}$ as a second recovered symbol sequence estimate $\hat{x}_{(k-l)_N}^{2,2i+1}$ for a second transmit antenna (p=2) by sign conversion and reordering of a first recovered symbol sequence estimate $\hat{x}_{(k-l)_N}^{1,2i}$ for a first transmit antenna (p=1); and
a second sign converter and reorder for outputting $\hat{x}_{(-k)_N}^{2,2i*}$ as a second recovered symbol sequence estimate $\hat{x}_{(k-l)_N}^{1,2i+1}$ for the first transmit antenna (p=1) by sign conversion and reordering of a first recovered symbol sequence estimate $\hat{x}_{(k-l)_N}^{2,2i}$ for the second transmit antenna (p=2).

* * * * *

UNITED STATES PATENT AND TRADEMARK OFFICE
CERTIFICATE OF CORRECTION

PATENT NO. : 7,586,992 B2
APPLICATION NO. : 11/335268
DATED : September 8, 2009
INVENTOR(S) : Kwun et al.

It is certified that error appears in the above-identified patent and that said Letters Patent is hereby corrected as shown below:

On the title page, second column

Please change the Examiner data from:

*Primary Examiner:* Helene Tayong

To this:

*Primary Examiner:* Shuwang Liu
*Assistant Examiner:* Helene Tayong

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,586,992 B2 |
| APPLICATION NO. | : 11/335268 |
| DATED | : September 8, 2009 |
| INVENTOR(S) | : Kwun et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Twenty-first Day of September, 2010

David J. Kappos
*Director of the United States Patent and Trademark Office*